US007594851B2

(12) United States Patent
Falconer

(10) Patent No.: US 7,594,851 B2
(45) Date of Patent: Sep. 29, 2009

(54) GAMING DEVICE HAVING MULTIPLE IDENTICAL SETS OF SIMULTANEOUSLY ACTIVATED REELS

(75) Inventor: Neil D. Falconer, Reno, NV (US)

(73) Assignee: IGT, Reno, NV (US)

( * ) Notice: Subject to any disclaimer, the term of this patent is extended or adjusted under 35 U.S.C. 154(b) by 688 days.

(21) Appl. No.: 11/015,441

(22) Filed: Dec. 17, 2004

(65) Prior Publication Data

US 2005/0101379 A1 May 12, 2005

Related U.S. Application Data

(63) Continuation of application No. 09/963,922, filed on Sep. 26, 2001, now Pat. No. 6,832,957.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................ 463/20; 463/16; 463/25; 463/26

(58) Field of Classification Search .................. 463/16, 463/20, 25–26

See application file for complete search history.

(56) References Cited

U.S. PATENT DOCUMENTS

| | | | |
|---|---|---|---|
| 4,621,814 | A | 11/1986 | Stepan et al. |
| 4,695,053 | A | 9/1987 | Vazquez, Jr. et al. |
| 4,838,552 | A | 6/1989 | Hagiwara |
| 4,856,787 | A | 8/1989 | Itkis |
| 4,874,173 | A | 10/1989 | Kishishita |
| 5,152,529 | A | 10/1992 | Okada |
| 5,342,047 | A | 8/1994 | Heidel et al. |
| 5,393,061 | A | 2/1995 | Manship et al. |
| 5,395,111 | A | 3/1995 | Inoue |
| 5,569,084 | A | 10/1996 | Nicastro et al. |

(Continued)

FOREIGN PATENT DOCUMENTS

GB 2098778 11/1982

OTHER PUBLICATIONS

Fey, Marshall, Slot machines—A Pictorial History of the First 100 Years, 1997, Liberty Bell Books, 5th Ed., various pages.

*Primary Examiner*—Dmitry Suhol
*Assistant Examiner*—Jason Pinheiro
(74) *Attorney, Agent, or Firm*—K&L Gates LLP

(57) ABSTRACT

The present invention involves a gaming device that provides a primary game which utilizes multiple sets of identical reels. The sets of reels simultaneously spin. A player is able to wager on paylines on one or more of said sets of reels. The gaming device also allows a player to wager on predetermined combinations of gaming symbols which occur over the plurality of sets of reels. The method of the present invention enables a player to simultaneously play multiple paylines on a plurality of identical sets of reels. The method enables a player to easily see different paylines by reducing the complexity of such paylines and duplicating paylines on sets of reels. The method provides novel arrangements of wagering combinations between the sets of reels which provide additional excitement to players. The method also reduces the complexity of software needed to evaluate multiple paylines.

24 Claims, 6 Drawing Sheets

U.S. PATENT DOCUMENTS

| | | | | |
|---|---|---|---|---|
| 5,584,764 | A | 12/1996 | Inoue | |
| 5,609,524 | A | 3/1997 | Inoue | |
| 5,697,843 | A | 12/1997 | Manship et al. | |
| 5,704,835 | A | 1/1998 | Dietz, II | |
| 5,722,891 | A | 3/1998 | Inoue | |
| 5,775,692 | A | 7/1998 | Watts et al. | |
| 5,816,915 | A | 10/1998 | Kadlik | |
| 5,890,962 | A | 4/1999 | Takemoto | |
| 5,951,397 | A | 9/1999 | Morro et al. | |
| 5,984,782 | A | 11/1999 | Inoue | |
| 6,068,552 | A | 5/2000 | Walker et al. | |
| 6,186,894 | B1 | 2/2001 | Mayeroff | |
| 6,210,279 | B1 | 4/2001 | Dickinson | |
| 6,227,971 | B1 | 5/2001 | Weiss | |
| 6,270,412 | B1 * | 8/2001 | Crawford et al. | 463/20 |
| 6,315,666 | B1 | 11/2001 | Mastera et al. | |
| 6,413,162 | B1 | 7/2002 | Baerlocher et al. | |
| 6,652,378 | B2 * | 11/2003 | Cannon et al. | 463/20 |
| 6,656,040 | B1 | 12/2003 | Brosnan et al. | |
| 2004/0192431 | A1 | 9/2004 | Singer et al. | |

* cited by examiner

GAMING DEVICE HAVING MULTIPLE IDENTICAL SETS OF SIMULTANEOUSLY ACTIVATED REELS

PRIORITY CLAIM

This application is a continuation of and claims the benefit of U.S. patent application Ser. No. 09/963,922, filed Sep. 26, 2001, now U.S. Pat. No. 6,832,957 the entire contents of which is incorporated herein.

CROSS REFERENCE TO RELATING APPLICATIONS

The present invention relates to the following co-pending, commonly owned, U.S. patent applications "GAMING DEVICE HAVING DIFFERENT SETS OF PRIMARY AND SECONDARY REEL SYMBOLS," Ser. No. 10/098,691; "GAMING DEVICE HAVING INDEPENDENT REEL COLUMNS," Ser. No. 10/165,260, "GAMING DEVICE HAVING INDEPENDENT BONUS REELS," Ser. No. 10/678,512, and "GAMING DEVICE HAVING A REPLICATING DISPLAY THAT PROVIDES WINNING PAYLINE INFORMATION", Ser. No. 10/715,638.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device having a plurality of identical sets of reels with gaming symbols, and more particularly to a slot gaming device which provides a base or primary game with a plurality of simultaneously playable identical sets of reels with gaming symbols.

BACKGROUND OF THE INVENTION

Gaming machines currently exist with mechanical or video reels having symbols thereon. In general, a player is awarded one or more credits in a slot gaming machine when one or more randomly generated symbols or combination of symbols appear on a payline. Known gaming devices also awards credits for combinations of scattered symbols.

To increase player enjoyment and excitement provided by gaming machines, gaming device manufacturers constantly strive to provide players with new types of gaming machines that attract players and keep players entertained. One proven way manufacturers use to make their gaming machines more popular is to increase the number and variety of winning combinations and provide more opportunities for the player to win. Providing more variety and opportunities holds the player's interest for a longer time and also enables the manufacturer to have a wider range of payouts for the winning combinations.

To increase the number and variety of winning combinations, manufacturers have increased the number of paylines. Paylines are predetermined arrays in the set of reels where the gaming machine evaluates whether a predetermined combination of symbols occurred. A payline may consist of any number or configurations of positions of gaming symbols.

For example, a payline in a set of reels can consist of a horizontal line of gaming symbols along the reels, or a diagonal line of gaming symbols along the reels, or a line overlapping several rows along the reels. It is well known to provide gaming machines with multiple paylines.

It should also be appreciated that gaming machines have become rather complex in comparison to the conventional three reel machines. Currently, many slot machines have a display with a set of five reels with three gaming symbols visible on each reel. This results in a visible set of gaming symbols in a three by five configuration. The majority of five reel slot machines have nine paylines, although twelve, fifteen, twenty and twenty-five payline games are becoming more common. Slot machines may also utilize more than five reels and/or more than three visible gaming symbols on each reel, such as a ten reel configuration with ten visible gaming symbols on each reel. Such a slot machine may have a large number of potential paylines on a singular set of reels. With the increased complexity of the number and the positioning of the paylines on a singular set of reels, it becomes increasingly unwieldy for the gaming software to evaluate a winning combination or combinations of gaming symbols. At some point, adding variety yields diminished returns because of increased complexity. Multiple winning combinations may also become too complex for the player (i.e., a player may win after a given spin of the reels and find it difficult to determine how, where or why the player has won).

Current gaming machines also provide secondary or bonus games in addition to primary games. These secondary or bonus games are generally different from the primary game. The secondary or bonus games are played separately from the primary game. For instance, secondary or bonus games may be evaluated with a different sets of predetermined combinations of the gaming symbols and/or different paylines. Bonus games may also be completely different games.

One known game which provides a variety of winning combinations which are readily understandable to players is International Game Technology's TOTEM POLE™ game which enables a player to play three different games on one gaming machine at the same time. The TOTEM POLE™ game has the following three separate games on three different sets of reels: RED, WHITE & BLUE™ game; DOUBLE DIAMOND™ game; and FIVE TIMES PAY™ game. The RED, WHITE & BLUE™ game pays a jackpot when the red "7" symbol, the white "7" symbol and the blue "7" symbol appear on a payline. The DOUBLE DIAMOND™ game utilizes the DOUBLE DIAMOND™ symbol as a wildcard. If one DOUBLE DIAMOND™ symbol lands on a payline in a winning combination, the game pays double the original award associated with the winning combination. If two DOUBLE DIAMOND™ symbols lands on a payline in a winning combination, the game pays four times the original award associated with the winning combination. The FIVE TIMES PAY™ game pays five times the original award of a winning combination when the FIVE TIMES PAY™ symbol appears in the combination on a payline. If two FIVE TIMES PAY™ symbols appear on a payline in a winning combination, the game pays twenty-five times the original award associated with the winning combination. If the FIVE TIMES PAY™ symbol appears in each position on the payline and the player played the maximum bet, the player wins the highest award associated with that game.

The TOTEM POLE™ game also includes a jackpot. If the TOTEM POLE™ symbol appears on each reel on each of the three paylines (i.e., the payline in each game) the player wins a jackpot if the player bets the maximum bet of six coins. The game thus has three paylines. The player may bet two coins on each payline. This game also allows the player to bet (a) one or two coins on the payline in the first game; (b) two coins on the payline in the first game and one or two coins on the payline in the second game; and (c) two coins on the payline in the first game, two coins on the payline in the second game, and one or two coins on the payline in the third game.

To increase player enjoyment and excitement, it is desirable to provide new gaming machines with a base or primary game whereby players can easily recognize winning combinations of gaming symbols on a multitude of paylines. It is also desirable to reduce the complexity of gaming software needed to evaluate winning combinations on multiple paylines.

SUMMARY OF THE INVENTION

The present invention provides a gaming device having a plurality of identical sets of reels for a base or primary game wherein the player places wagers on a number of paylines on the multiple sets of reels. The gaming device simultaneously activates or spins the reels in each of the plurality of sets of reels. The gaming device evaluates each payline the player has wagered on for a predetermined gaming symbol or combination of gaming symbols and awards the player credits (if any) depending on the amount wagered and the value associated with that particular winning gaming symbol or combination of gaming symbols on each set of reels. Because the sets of reels are identical, the gaming software is less complex and the player can readily determine how, where and why the player has won.

One embodiment of the present invention provides a gaming device wherein the player plays a video slot gaming machine. The gaming device video screen displays three identical sets of virtual gaming reels. Each set of reels consists of five virtual gaming reels with three virtual visible gaming symbols displayed on each reel. This embodiment of the invention has nine paylines associated with each set of virtual gaming reels. Thus, in one standard game, there are twenty-seven total paylines available to a player.

In this embodiment of the invention, the player chooses the number and location of the paylines to wager on. The player picks from a plurality of paylines from the three identical sets of virtual gaming reels in a conventional manner. The player also chooses the number of credits to wager on each payline in a conventional manner. Upon initiation of game play, all three sets of virtual gaming reels simultaneously spin. In one embodiment, this may appear to the player that the player is playing three separate slot gaming devices. All three sets of virtual gaming reels display randomly determined gaming symbols. The gaming device evaluates each payline the player has wagered on for a predetermined winning gaming symbol or winning combinations of gaming symbols. The gaming device software thus evaluates nine paylines for each set of gaming reels and repeats the evaluation for each set of reels. The gaming device software thus evaluates a total of twenty-seven paylines in this embodiment of the present invention. The player is awarded credits utilizing the value associated with the predetermined symbols or combinations of gaming symbols and the number of winning symbols or combinations on the paylines which the player has wagered on and the amount wagered by the player.

In one embodiment, each coin bet triggers at least one payline. For example, one coin can be bet on all nine paylines in the first set of reels. If an additional coin is wagered, the next coin bet is placed on the tenth line or the first line in the second set of reels. Similarly, a bet of the nineteenth coin is a bet on a payline in the third set of reels. Alternatively, the player can initiate a wager on each payline individually. In other words, the player can bet any amount of coins on any of the twenty-seven paylines, up to a certain maximum number of coins on each payline. Thus, in one embodiment, the player may wager five coins on each of the twenty-seven paylines or 135 coins for the game.

It is therefore an advantage of the present invention to provide a gaming device having multiple identical sets of reels.

A further advantage of the present invention to provide a gaming device which enables a player to play multiple paylines in a primary slot game where the player can distinguish predetermined winning combinations in easily recognized paylines.

Other features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
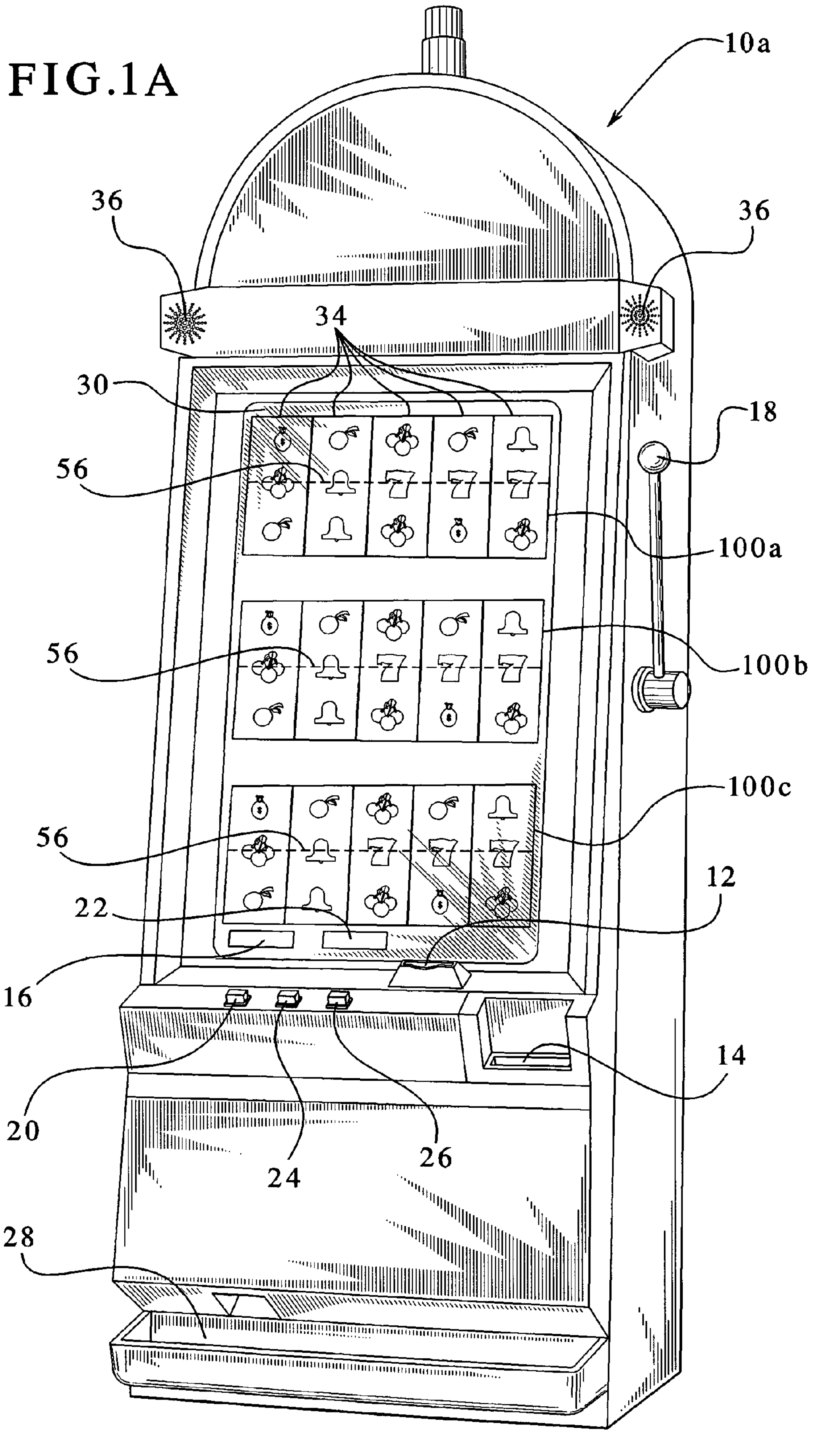
FIGS. 1A and 1B are front plan views of alternative embodiments of the gaming device of the present invention.
Figure 1B:
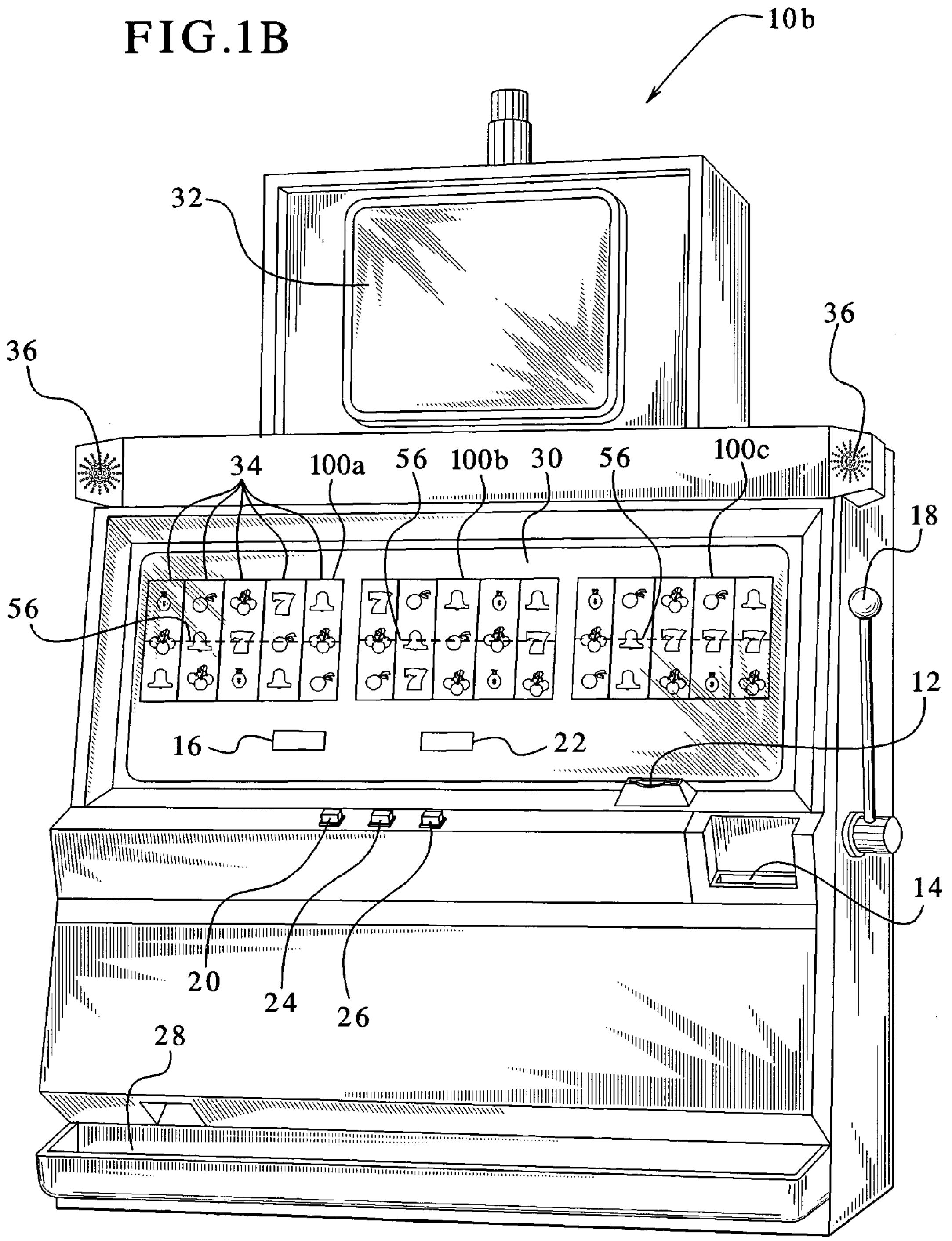

Referring now to the drawings, and in particular to FIGS. 1A and 1B, gaming device 10*a* and gaming device 10*b* illustrate two possible cabinet styles and display arrangements of the present invention and are collectively referred to herein as gaming device 10. The present invention includes the base or primary game (described below) being multiple identical games coordinated simultaneously during ordinary game play. The gaming device 10 is a slot machine having the controls, displays and features of a conventional slot machine, wherein the player operates the gaming device while standing or sitting. Gaming device 10 also includes being a pub-style or tabletop game (not shown), which a player operates while sitting.

The gaming device of the present invention may also include any bonus triggering events, bonus games as well as any progressive game coordinating with the base game. The symbols and indicia used for any of the base, bonus and progressive games include mechanical, electrical or video symbols and indicia.

The gaming device 10 includes monetary input devices. FIGS. 1A and 1B illustrate a coin slot 12 for coins or tokens and/or a payment acceptor 14 for paper money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a total bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. The wagering is discussed in more detail below. At any time, except while the reels are spinning, a player may "cash out" by pushing a cash out button 26 to receive coins or tokens in the coin payout tray 28 or other forms of payment, such as an amount printed on a ticket or credited to a credit cards, debit cards or smart cards. Well known ticket printing and card reading machines (not illustrated) are commercially available.

The gaming device of the present invention may also include one or more display devices. The embodiment shown in FIG. 1A includes a central display device 30, and the alternative embodiment shown in FIG. 1B includes a central display device 30 as well as an upper display device 32. The display devices may display any visual representation or exhibition, including but not limited to movement of physical objects such as mechanical reels and wheels, dynamic lighting and video images. The display device may include any viewing surface such as glass, a video monitor or screen, a liquid crystal display or any other static or dynamic display mechanism.

The slot machine primary game of gaming device 10 preferably displays a plurality of reels 34 arranged in at least two, and preferably three, separate sets 100*a*, 100*b* and 100*c*. Each set preferably has three to five reels 34 in video form on one or more of the display devices. Each reel 34 has an identical plurality of indicia such as bells, hearts, fruits, numbers, letters, bars or other symbols or images which preferably correspond to a theme associated with the gaming device 10. The display device displaying the video reels 34 is preferably a video monitor. The gaming device 10 also includes speakers 36 for making sounds or playing music.

Figure 2:
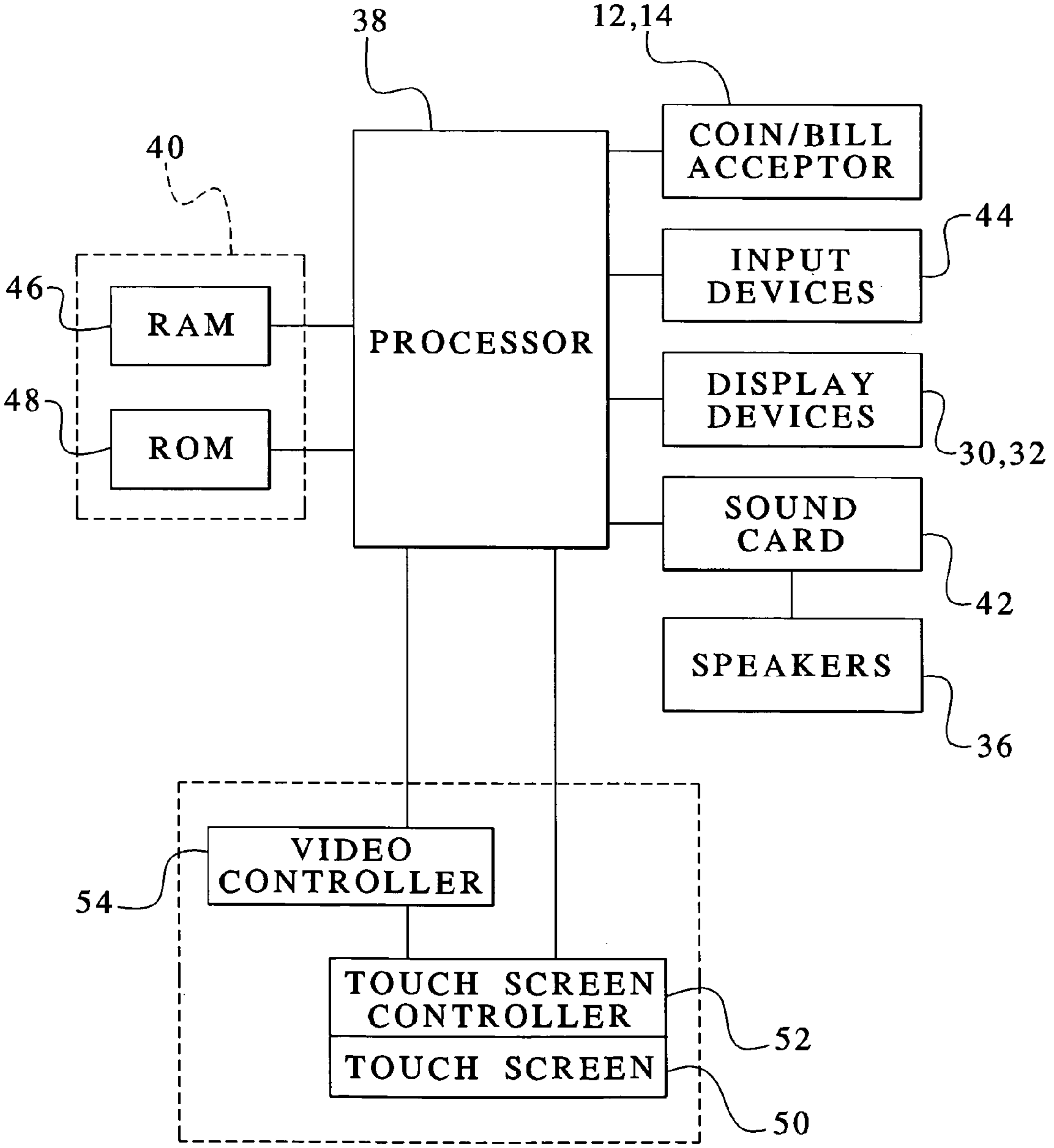
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places and things. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44 to input signals into gaming device. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or the "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. A player can make decisions and input signals into the gaming device 10 by touching touch screen 50 at the appropriate places. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming the device 10, the player inserts the appropriate amount of money or tokens at coin slot 12 or bill acceptor 14 and then pulls the arm 18 or pushes the play button 20. Each set of reels 100*a*, 100*b* and 100*c* will then simultaneously spin. It can be appreciated that the number of sets of reels spinning can be determined by the amount of credits the player wagers. The gaming device also includes buttons or other indicators (not shown) which enable the player to select paylines and wager on individual paylines. Eventually, the reels 34 will come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, may include one or more bonus games that give players the opportunity to win credits. Bonus games include a program that automatically begins when the player achieves a qualifying condition in the base game. The gaming device may also employ a video-based central display device 30 or 32 for the bonus game.

The qualifying condition may include a particular symbol or symbol combination generated on a display device. As illustrated in the multiple reel slot game shown in FIGS. 1A and 1B, the qualifying condition includes the number seven appearing on three adjacent reels 34 along a payline 56 in the set of reels 100*c*. It should be appreciated that the present invention includes one or more paylines 56 in at least two sets of reels 100, wherein the paylines 56 can be horizontal, diagonal on any set of reels 100 or in certain positions on each set of reels 100 or any combination thereof.

Multiple Identical Sets of Reels

A player initiates the gaming device 10 by inserting a predetermined number of credits needed to play the base game. The gaming device determines if randomly generated gaming symbols on paylines 56, which the player wagered on, match predetermined symbols or combinations of symbols. If randomly generated gaming symbols on a payline 56 or paylines 56 matches a predetermined symbol or combination of gaming symbols, the player is awarded one or more credits. The present invention may also include scatter pays.

As indicated above, one embodiment includes a central display device 30 displaying three identical sets of reels 100*a*, 100*b* and 100*c*, with each set consisting of five reels 34 and a plurality of gaming symbols on each reel. Other embodiments may have two or more than three sets of reels. Yet other embodiments may have two or more sets of reels consisting of more or less than five reels 34. It should be appreciated that there may be more displays, such as a bet display for each set of reels and for each payline 56 whereby a player sees the bet associated with each payline 56.

Figure 3A:
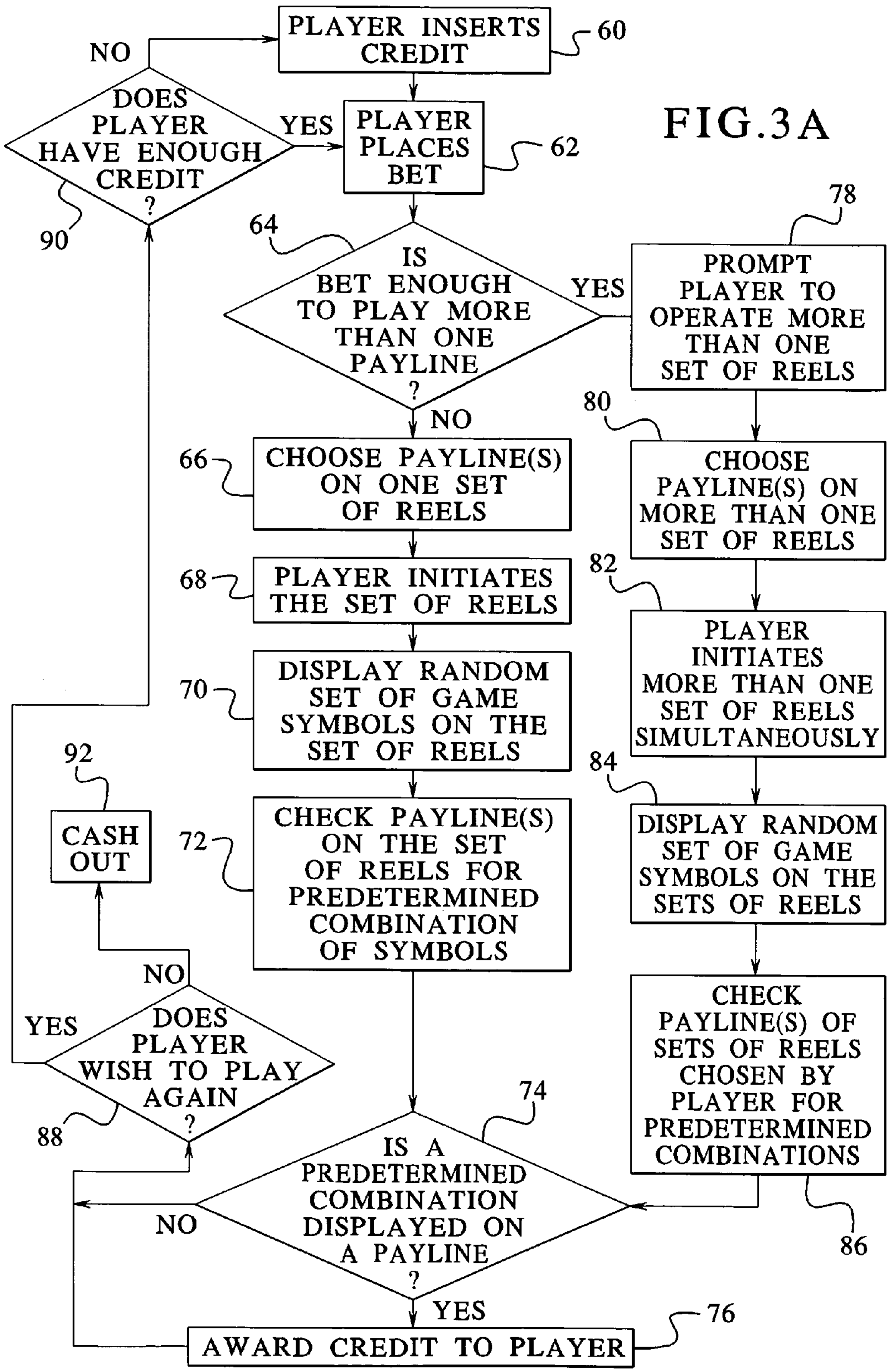
FIGS. 3A and 3B are flow diagrams of different embodiments of standard gaming schemes of the present invention.
Figure 3B:
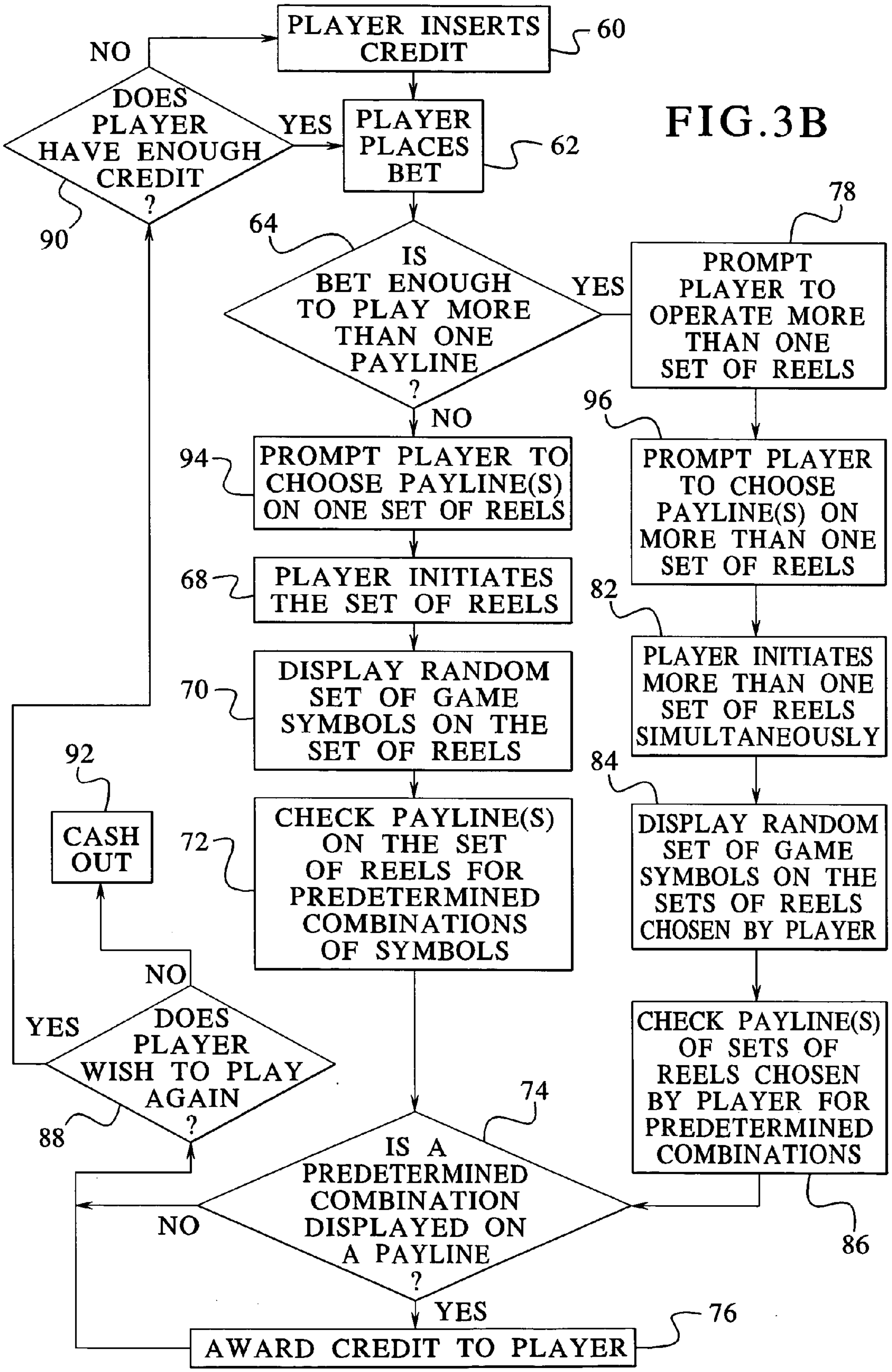

In the embodiment illustrated by FIG. 3A and FIG. 3B, if the player places a bet on the base game 62, the game evaluates if the bet is large enough for the player to play more than one paylines, represented by block 64. If the bet is not large enough, the game chooses payline(s) 56 on one set of reels, as indicated by block 66.

In an alternative embodiment, the game prompts the player to choose payline(s) 56 on the one set of reels as indicated by block 94. The player initiates the single set of reels as indicated by block 68. The game display a random set of game symbols on the set of reels as indicated by block 70. The game checks the paylines 56 on the set of reels 100*a* for a predetermined combination of symbols, represented by block 72.

If there is a symbol or a combination of gaming symbols on payline 56 in game play which matches a predetermined winning symbol or a combination of gaming symbols on the paylines chosen by the player, indicated by block 74, the player is awarded credits as indicated by block 76.

In various embodiments, after the game either awards credits to the player 76 or determines that a predetermined winning symbol or winning symbol combination is not displayed on the paylines 56 chosen by the player 74, the game prompts the player to determine whether the player wishes to play again, represented by block 88.

In one embodiment, if the player does not want to play again, the game cashes out the player, represented by block 92. If the player wishes to play again, the game determines whether the player has enough credits to play again, represented by block 90. If the player does have enough credits, the game enables the player to place a bet 62, as discussed above. If the player does not have enough credits, the game enables the player to insert credits 60, as discussed above.

In another alternative embodiment, the player chooses the paylines 56 on each set of reels 100*a*, 100*b* and 100*c* to put into game play using a payline button (not shown) as indicated by block 96. The player simultaneously activates the sets of reels chosen as indicated by block 82 by pulling the arm 18 or pushing the play button 20. The plurality of reels 34 spins simultaneously. The game displays randomly generated game symbols on the sets of reels 100*a*, 100*b* and 100*c* as indicated by block 84. The game evaluates the paylines 56 on the sets of reels 100*a*, 100*b* and 100*c* chosen by the player for winning symbol or combination of gaming symbols 86.

If there is a symbol or a combination of gaming symbols on a payline 56 in game play which matches a predetermined winning symbol or a combination of gaming symbols on the paylines chosen by the player, the player is awarded credits as indicated by block 76.

With the availability of more than one set of reels, it should also be appreciated that new winning combinations of gaming symbols and winning combinations utilizing the plurality of sets of reels for credits and bonus games can be implemented. One embodiment of the present invention provides a greater variation to a traditional "scatter pay" award scheme. A player is awarded credit(s) or bonus game(s) in "scatter pay" when a predetermined number of the same symbol appears on a set of reels. An embodiment of the present invention provides an improved chance of winning on certain "scatter pay" rounds where the greater number of sets of reels provide a higher chance for the same gaming symbol to appear. Higher occurrences of the same gaming symbol in "scatter pay" can be associated with more frequent payouts which provides greater excitement to the player. Different combinations of gaming symbols on different sets of reels can also employed. For example, a payout can be given when one gaming symbol appears on the first set of reels 100*a*, and the same gaming symbol appears twice on the second set of reels 100*b*, and the same gaming symbol appears three times on the third set of reels 100*c*.

Another embodiment of the present embodiment provides novel ways of winning by utilizing the plurality of sets of reels. For example, a player can place a bet on which sets of reels (i.e., 100*a*, 100*b* or 100*c*) will have a winning or other combination of symbols appear on a payline 56. It can be appreciated that a player can also place wagers on different combinations of sets of reels on which predetermined combinations of symbols appear on paylines 56 or in the alternative place a bet on which set of reels will not have a winning or other combination of symbols appear on a payline 56. A player can also be awarded credits or one or more bonus games if more than one sets of reels have winning combinations of symbols on paylines 56. In one such embodiment, a player is awarded a jackpot or bonus award if the same combination of symbols appears on a payline 56 in two or more sets of reels 100.

In another embodiment, a player can play a wildcard payline 56 which may appear on any one of the plurality of sets of reels. The player is awarded credit when a winning combination of symbols appears on any payline 56 in any of the sets of reels. A player can also be awarded credit when a player bets that one particular combination of symbols will appear on a payline 56 in any of the sets of reels.

Figure 4:
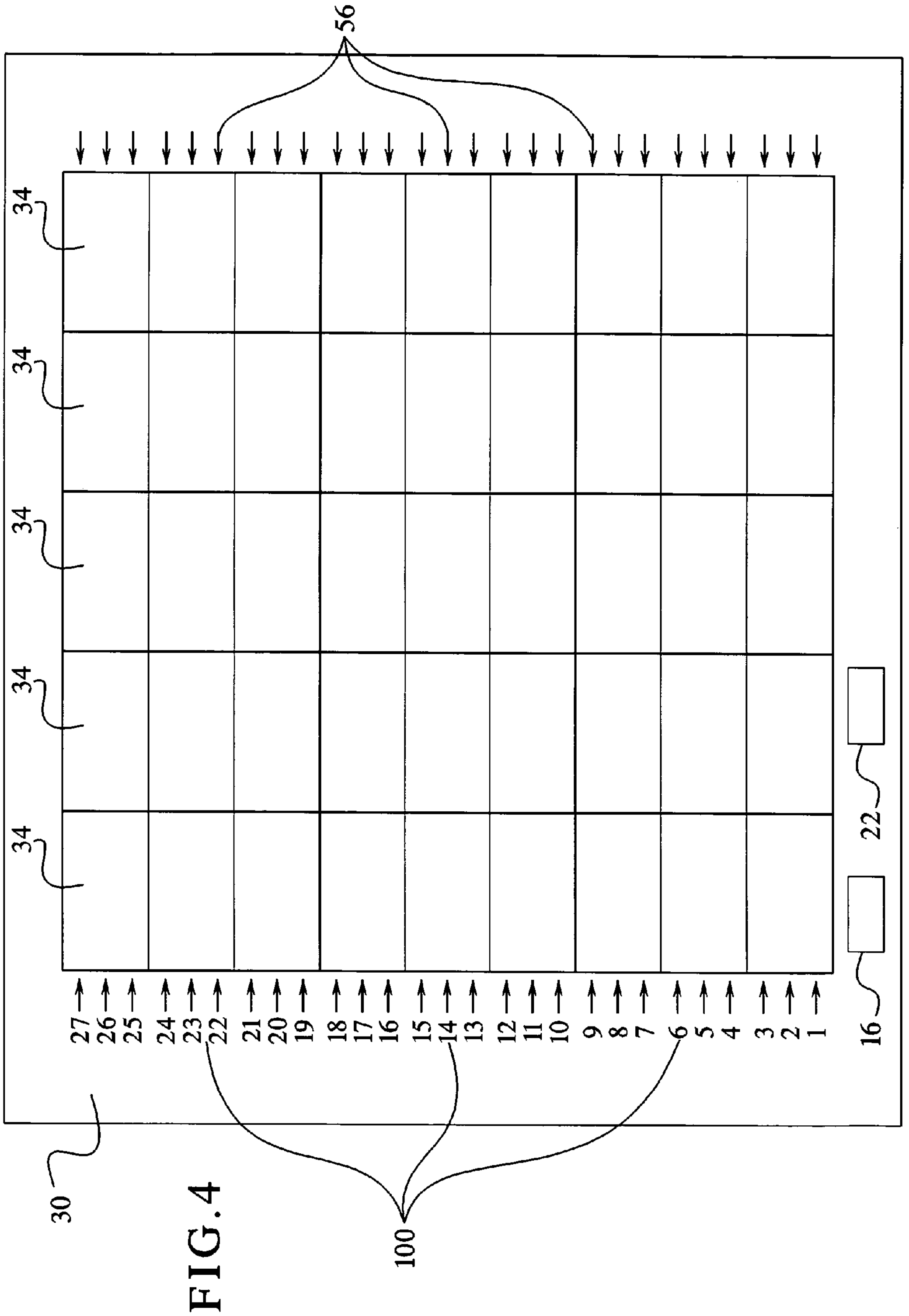
FIG. 4 is a front elevational view of an alternative display for the gaming device of the present invention.

In another embodiment as depicted in FIG. 4, each coin bet triggers at least one payline 56. If one coin is bet on all nine paylines 56 in the first set of reels 100*a* and an additional coin is wagered, the next coin bet is placed on the tenth payline or the first line in the second set of reels 100*b*. As the player places additional bets the display may indicate to the player which paylines 56 are in play. Similarly, a bet of the nineteenth coin is a bet on a payline 56 in the third set of reels 100*c*. In another embodiment, the player can initiate a wager on each payline 56 individually. The player can bet any amount of coins on any of the twenty-seven paylines 56, up to a certain maximum number of coins on each payline 56. Thus, in one embodiment, the player may wager five coins on each of the twenty-seven paylines 56 or 135 coins for the game.

In another alternative embodiment of the present invention, the central display 30 displays all of the sets of reels spinning simultaneously during game play or displays only the sets of reels spinning that are in actual game play. Yet another alternative embodiment is that the central display 30 can display the sets of reels not chosen by the player in a simultaneous demonstration during game play. This demonstration can be made to provide the player with information on other paylines 56 not wagered on by the player thereby providing greater excitement by offering more paylines 56 to the player.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited by only the scope of the claims.

The invention is hereby claimed as follows:

1. A gaming device operable under control of a processor, said gaming device comprising:

a first set of reels controlled by the processor and having a first plurality of reels;

a second set of reels controlled by the processor and having a second plurality of reels;

a plurality of symbols on each of said sets of reels;

a first set of paylines associated with said first set of reels, said first set of paylines including at least one payline;

a second set of paylines associated with said second set of reels, said second set of paylines including at least one payline;

at least one wager input device in communication with the processor and which enables a player, for a single activation of both the first set of reels and the second set of reels, to place separate individual wagers on each of:

(a) at least one of the paylines associated with the first set of reels, (b) at least one of the paylines associated with the second set of reels, and (c) one of:

(i) both an occurrence of any winning symbol or winning symbol combination on the first set of reels and any winning symbol or winning symbol combination not occurring on the second set of reels, and (ii) both an occurrence of any winning symbol or winning symbol combination on the second set of reels and any winning symbol or winning symbol combination not occurring on the first set of reels; and a plurality of awards including:

(a) at least one of said awards adapted to be provided to the player for each winning symbol or winning symbol combination that occurs on each wagered on payline, (b) at least one of said awards adapted to be provided to the player if the player wagered on (c)(i) above, a winning symbol or winning symbol combination occurs on one of the wagered on paylines associated with said first set of reels, and a winning symbol or winning symbol combination does not occur on any of the wagered on paylines associated with said second set of reels, and (c) at least one of said awards adapted to be provided to the player if the player wagered on (c)(ii) above, a winning symbol or winning symbol combination occurs on one of the wagered on paylines associated with said second set of reels, and a winning symbol or winning symbol combination does not occur on any of the wagered on paylines associated with said first set of reels.

2. A gaming device operable under control of a processor, said gaming device comprising:

a first set of reels controlled by the processor, said first set of reels having a first plurality of reels;

a second set of reels controlled by the processor, said second set of reels having a second plurality of reels;

a plurality of symbols on each of said sets of reels;

a first set of paylines associated with said first set of reels, said first set of paylines including at least one payline;

a second set of paylines associated with said second set of reels, said second set of paylines including at least one payline;

at least one wager input device in communication with the processor and which enables a player, for a single activation of both the first set of reels and the second set of reels, to place separate individual wagers on each of:

(a) at least one of the paylines associated with the first set of reels, (b) at least one of the paylines associated with the second set of reels, and (c) one of:

(i) a particular predetermined symbol or symbol combination occurring on one of the wagered on paylines associated with the first set of reels, wherein said particular predetermined symbol or symbol combination is determined prior to the single activation of both the first set of reels and the second set of reels, and (ii) said particular predetermined symbol or symbol combination occurring on one of the paylines associated with said second set of reels; and a plurality of awards including:

(a) at least one of said awards adapted to be provided to the player for each winning symbol or winning symbol combination that occurs on each wagered on payline, (b) at least one of said awards adapted to be provided to the player if the player wagered on (c)(i) above, the particular predetermined symbol or symbol combination occurs on one of the wagered on paylines associated with said first set of reels, and the particular predetermined symbol or symbol combination does not occur on any of the wagered on paylines associated with said second set of reels, wherein if the player wagered on (c)(i) above and any winning symbol or winning symbol combination other than the particular predetermined symbol or symbol combination associated with the first set of reels occurs on any of the wagered on paylines associated with the first set of reels, no award is provided to the player for said wager on (c)(i) above, and (c) at least one of said awards adapted to be provided to the player if the player wagered on (c)(ii) above, the particular predetermined symbol or symbol combination occurs on one of the wagered on paylines associated with said second set of reels, and the particular predetermined symbol or symbol combination does not occur on any of the wagered on paylines associated with said first set of reels, wherein if the player wagered on (c)(ii) above and any winning symbol or winning symbol combination other than the particular predetermined symbol or symbol combination associated with the second set of reels occurs on any of the wagered on paylines associated with the second set of reels, no award is provided to the player for said wager on (c)(ii) above.

3. A gaming device operable under control of a processor, said gaming device comprising:

a first set of reels controlled by the processor, said first set of reels having a first plurality of reels;

a second set of reels controlled by the processor, said second set of reels having a second plurality of reels;

a plurality of symbols on each of said sets of reels;

a first set of paylines associated with said first set of reels, said first set of paylines including at least one payline;

a second set of paylines associated with said second set of reels, said second set of paylines including at least one payline;

at least one wager input device in communication with the processor and which enables a player, for a single activation of both the first set of reels and the second set of reels, to place separate individual wagers on each of:

(a) at least one of the paylines associated with the first set of reels, (b) at least one of the paylines associated with the second set of reels, and (c) a particular predetermined symbol or symbol combination occurring on any of the wagered on paylines associated with the first set of reels and said particular predetermined symbol or symbol combination also occurring on any of the wagered on paylines associated with said second set of reels, wherein said particular predetermined symbol or symbol combination is determined prior to the single activation of both the first set of reels and the second set of reels; and a plurality of awards including:

(a) at least one of said awards adapted to be provided to the player for each winning symbol or winning symbol combination that occurs on each wagered on payline, and (b) at least one of said awards adapted to be provided to the player if the player wagered on (c) above, the particular predetermined symbol or symbol combination occurs on any of the wagered on paylines associated with said first set of reels, and the particular predetermined symbol or symbol combination occurs on any of the wagered on paylines associated with said second set of reels, wherein if the player wagered on (c) above and any winning symbol or symbol combination other than the particular predetermined symbol or symbol combination occurs on any of the wagered on paylines associated with the first set of reels and the second set of reels, no award is provided to the player for said wager on (c) above.

4. A gaming device operable under control of a processor, said gaming device comprising:

a first game controlled by the processor;

a second game controlled by the processor;

at least one display device operable with the processor and adapted to display said first game and said second game;

at least one wager input device in communication with the processor and which enables a player, for a single play of both the first game and the second game, to place separate individual wagers on each of:

(a) the first game, (b) the second game, and (c) one of:

(i) both any winning result occurring in the first game and any winning result not occurring in the second game, and (ii) both any winning result occurring in the second game and any winning result not occurring in the first game; and a plurality of awards including:

(a) at least one of said awards adapted to be provided to the player for each winning result that occurs in the first and second games, (b) at least one of said awards adapted to be provided to the player if the player wagered on (c)(i) above, and a winning result occurs in the first game and no winning result occurs in the second game, and (c) at least one of said awards adapted to be provided to the player if the player wagered on (c)(ii) above, and a winning result occurs in the second game and no winning result occurs in the first game.

5. A gaming device operable under control of a processor, said gaming device comprising:

a first game controlled by the processor;

a second game controlled by the processor;

at least one display device operable with the processor and adapted to display said first game and said second game;

at least one wager input device in communication with the processor and which enables a player, for a single play of both the first game and the second game, to place separate individual wagers on each of:

(a) the first game, (b) the second game, and (c) one of:

(i) a particular predetermined result occurring in the first game and said particular predetermined result not occurring in the second game, wherein said particular predetermined result is determined prior to the single play of both the first game and the second game, and (ii) the particular predetermined result occurring in the second game and said particular predetermined result not occurring in the first game; and a plurality of awards including:

(a) at least one of said awards adapted to be provided to the player for each winning result that occurs in the first and second games, (b) at least one of said awards adapted to be provided to the player if the player wagered on (c)(i) above, and the particular predetermined result occurs in the first game and said particular predetermined result does not occur in the second game, and (c) at least one of said awards adapted to be provided to the player if the player wagered on (c)(ii) above, and the particular predetermined result occurs in the second game and said particular predetermined result does not occur in the first game.

6. A gaming device operable under control of a processor, said gaming device comprising:

a first game controlled by the processor;

a second game controlled by the processor;

at least one display device operable with the processor and adapted to display said first game and said second game;

at least one wager input device in communication with the processor and which enables a player, for a single play of both the first game and the second game, to place separate individual wagers on each of:

(a) the first game, (b) the second game, and (c) a particular predetermined result occurring in the first game and said particular predetermined result also occurring in the second game, wherein said particular predetermined result is determined prior to the single play of both the first game and the second game; and a plurality of awards including:

(a) at least one of said awards adapted to be provided to the player for each winning result that occurs in the first and second games, and (b) at least one of said awards adapted to be provided to the player if the player wagered on (c) above and the particular predetermined result occurs in the first game and the particular predetermined result also occurs in the second game, wherein if the player wagered on (c) above and any result occurs other than the particular predetermined result in the first game and the second game, no award is provided to the player for said wager on (c) above.

7. A method of operating a gaming device including a plurality of instructions, said method comprising:

(a) for a single activation of both a first set of reels having a first plurality of reels and a second set of reels having a second plurality of reels, causing at least one processor to execute the plurality of instructions to cause at least one wager input device to enable separate individual wagers to be placed on each of:

(i) at least one of a first set of paylines associated with the first set of reels, said first set of paylines including at least one payline, (ii) at least one of a second set of paylines associated with the second set of reels, said second set of paylines including at least one payline, and (iii) one of:

(A) both an occurrence of any winning symbol or winning symbol combination on the first set of reels and the non-occurrence of any winning symbol or winning symbol combination on the second set of reels, and (B) both an occurrence of any winning symbol or winning symbol combination on the second set of reels and the non-occurrence of any winning symbol or winning symbol combination on the first set of reels;

(b) causing the at least one processor to execute the plurality of instructions to cause at least one award to be provided for each winning symbol or winning symbol combination that occurs on each wagered on payline;

(c) causing the at least one processor to execute the plurality of instructions to cause at least one award to be provided if any wager was placed on (a)(iii)(A) above, a winning symbol or winning symbol combination occurs on one of the wagered on paylines associated with said first set of reels, and a winning symbol or winning symbol combination does not occur on any of the wagered on paylines associated with said second set of reels; and (d) causing the at least one processor to execute the plurality of instructions to cause at least one award to be provided if any wager was placed on (a)(iii)(B) above, a winning symbol or winning symbol combination occurs on one of the wagered on paylines associated with said second set of reels, and a winning symbol or winning symbol combination does not occur on any of the wagered on paylines associated with said first set of reels.

8. The method of claim 7, which is operated through a data network.

9. The method of claim 8, wherein the data network is an internet.

10. A method of operating a gaming device including a plurality of instructions, said method comprising:

(a) for a single activation of both a first set of reels having a first plurality of reels and a second set of reels having a second plurality of reels, causing at least one processor to execute the plurality of instructions to cause at least one wager input device to enable separate individual wagers to be placed on each of:

(i) at least one of a first set of paylines associated with the first set of reels, said first set of paylines including at least one payline, (ii) at least one of a second set of paylines associated with the second set of reels, said second set of paylines including at least one payline, and (iii) one of:

(A) a particular predetermined symbol or symbol combination occurring on one of the wagered on paylines associated with the first set of reels, wherein said particular predetermined symbol or symbol combination is determined prior to the single activation of both the first set of reels and the second set of reels, and (B) said particular predetermined symbol or symbol combination occurring on one of the paylines associated with said second set of reels, (b) causing the at least one processor to execute the plurality of instructions to cause at least one award to be provided for each winning symbol or winning symbol combination that occurs on each wagered on payline;

(c) causing the at least one processor to execute the plurality of instructions to cause at least one award to be provided if any wager was placed on (a)(iii)(A) above, the particular predetermined symbol or symbol combination occurs on one of the wagered on paylines associated with said first set of reels, and the particular predetermined symbol or symbol combination does not occur on any of the wagered on paylines associated with said second set of reels, wherein if the player wagered on (a)(iii)(A) above and any winning symbol or winning symbol combination other than the particular predetermined symbol or symbol combination associated with the first set of reels occurs on any of the wagered on paylines associated with the first set of reels, no award is provided for said wager on (a)(iii)(A) above; and (d) causing the at least one processor to execute the plurality of instructions to cause at least one award to be provided if any wager was placed on (a)(iii)(B) above, the particular predetermined symbol or symbol combination occurs on one of the wagered on paylines associated with said second set of reels, and the particular predetermined symbol or symbol combination does not occur on any of the wagered on paylines associated with said first set of reels, wherein if the player wagered on (a)(iii)(B) above and any winning symbol or winning symbol combination other than the particular predetermined symbol or symbol combination associated with the second set of reels occurs on any of the wagered on paylines associated with the second set of reels, no award is provided for said wager on (a)(iii)(A) above.

11. The method of claim 10, which is operated through a data network.

12. The method of claim 11, wherein the data network is an internet.

13. A method of operating a gaming device including a plurality of instructions, said method comprising:

(a) for a single activation of both a first set of reels having a first plurality of reels and a second set of reels having a second plurality of reels, causing at least one processor to execute the plurality of instructions to cause at least one wager input device to enable separate individual wagers to be placed on each of:

(i) at least one of a first set of paylines associated with the first set of reels, said first set of paylines including at least one payline, (ii) at least one of a second set of paylines associated with the second set of reels, said second set of paylines including at least one payline, and (iii) a particular predetermined symbol or symbol combination occurring on any of the wagered on paylines associated with the first set of reels and said particular predetermined symbol or symbol combination also occurring on any of the wagered on paylines associated with said second set of reels, wherein said particular predetermined symbol or symbol combination is determined prior to the single activation of both the first set of reels and the second set of reels;

(b) causing the at least one processor to execute the plurality of instructions to cause at least one award to be provided for each winning symbol or winning symbol combination that occurs on each wagered on payline; and (c) causing the at least one processor to execute the plurality of instructions to cause at least one award to be provided if any wager was placed on (a)(iii) above, the particular predetermined symbol or symbol combination occurs on any of the wagered on paylines associated with said first set of reels, and the particular predetermined symbol or symbol combination occurs on any of the wagered on paylines associated with said second set of reels, wherein if the player wagered on (a)(iii) above and any winning symbol or symbol combination other than the particular predetermined symbol or symbol combination occurs on any of the wagered on paylines associated with the first set of reels and the second set of reels, no award is provided for said wager on (a)(iii) above.

14. The method of claim 13, which is operated through a data network.

15. The method of claim 14, wherein the data network is an internet.

16. A method of operating a gaming device including a plurality of instructions, said method comprising:

(a) for a single play of both a first game and a second game, causing at least one processor to execute the plurality of instructions to cause at least one wager input device to enable separate individual wagers to be placed on each of:
  (i) the first game,
  (ii) the second game, and
  (iii) one of:
    (A) both any winning result occurring in the first game and any winning result not occurring in the second game, and
    (B) both any winning result occurring in the second game and any winning result not occurring in the first game;

(b) causing the at least one processor to execute the plurality of instructions to cause at least one award to be provided for each winning result that occurs in the first and second games;

(c) causing the at least one processor to execute the plurality of instructions to cause at least one award to be provided if any wager was placed on (a)(iii)(A) above, a winning result occurs in the first game, and no winning result occurs in the second game; and (d) causing the at least one processor to execute the plurality of instructions to cause at least one award to be provided if any wager was placed on (a)(iii)(B) above, a winning result occurs in the second game, and no winning result occurs in the first game.

17. The method of claim 16, which is operated through a data network.

18. The method of claim 17, wherein the data network is an internet.

19. A method of operating a gaming device including a plurality of instructions, said method comprising:

(a) for a single play of both a first game and a second game, causing at least one processor to execute the plurality of instructions to cause at least one wager input device to enable separate individual wagers to be placed on each of:
  (i) the first game,
  (ii) the second game, and
  (iii) one of:
    (A) both a particular predetermined result occurring in the first game and said particular predetermined result not occurring in the second game, wherein said particular predetermined result is determined prior to the single play of both the first game and the second game, and
    (B) both the particular predetermined result occurring in the second game and said particular predetermined result not occurring in the first game;

(b) causing the at least one processor to execute the plurality of instructions to cause at least one award to be provided for each winning result that occurs in the first and second games;

(c) causing the at least one processor to execute the plurality of instructions to cause at least one award to be provided if any wager was placed on (a)(iii)(A) above and the particular predetermined result occurs in the first game and said particular predetermined result does not occur in the second game; and (d) causing the at least one processor to execute the plurality of instructions to cause at least one award to be provided if any wager was placed on (a)(iii)(B) above and the particular predetermined result occurs in the second game and said particular predetermined result does not occur in the first game.

20. The method of claim 19, which is operated through a data network.

21. The method of claim 20, wherein the data network is an internet.

22. A method of operating a gaming device including a plurality of instructions, said method comprising:

(a) for a single play of both a first game and a second game, causing at least one processor to execute the plurality of instructions to cause at least one wager input device to enable separate individual wagers to be placed on each of:
  (i) the first game,
  (ii) the second game, and
  (iii) a particular predetermined result occurring in the first game and said particular predetermined result also occurring in the second game wherein said particular predetermined result is determined prior to the single play of both the first game and the second game;

(b) causing the at least one processor to execute the plurality of instructions to cause at least one award to be provided for each winning result that occurs in the first and second games; and (c) causing the at least one processor to execute the plurality of instructions to cause at least one award to be provided if any wager was placed on (a)(iii) above, the particular predetermined result occurs in the first game, and the particular predetermined result also occurs in the second game, wherein if the player wagered on (a)(iii) above and any result occurs other than the particular predetermined result in the first game and the second game, no award is provided for said wager on (a)(iii) above.

23. The method of claim 22, which is operated through a data network.

24. The method of claim 23, wherein the data network is an internet.

* * * * *

UNITED STATES PATENT AND TRADEMARK OFFICE

CERTIFICATE OF CORRECTION

PATENT NO. : 7,594,851 B2
APPLICATION NO. : 11/015441
DATED : September 29, 2009
INVENTOR(S) : Neil D. Falconer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 991 days.

Signed and Sealed this

Twenty-eighth Day of September, 2010

David J. Kappos
*Director of the United States Patent and Trademark Office*